United States Patent [19]

Sticht

[11] Patent Number: 5,170,876
[45] Date of Patent: Dec. 15, 1992

[54] INSTALLATION FOR MANUFACTURING AND/OR ASSEMBLING COMPONENTS

[76] Inventor: Walter Sticht, Karl-Heinrich-Waggerl-Strasse 8, A-4800 Attnang-Puchheim, Austria

[21] Appl. No.: 879,709
[22] PCT Filed: Mar. 3, 1989
[86] PCT No.: PCT/AT89/00022
     § 371 Date: Aug. 17, 1990
     § 102(e) Date: Aug. 17, 1990
[87] PCT Pub. No.: WO89/08002
     PCT Pub. Date: Sep. 8, 1989

Related U.S. Application Data

[63] Continuation of Ser. No. 474,833, Aug. 17, 1990, abandoned.

[30] Foreign Application Priority Data

Mar. 3, 1988 [AT] Austria ........................ 548/88

[51] Int. Cl.$^5$ .............................................. B65G 15/64
[52] U.S. Cl. .................................................. 198/345.3
[58] Field of Search ............... 198/345.1, 345.2, 345.3, 198/343.1, 343.2

[56] References Cited

U.S. PATENT DOCUMENTS

| | | | |
|---|---|---|---|
| 3,858,707 | 1/1975 | Block et al. ................. | 198/345.3 X |
| 3,998,316 | 12/1976 | Kamm .......................... | 198/346.2 X |
| 4,158,315 | 6/1979 | Kensrue et al. .............. | 74/31 |
| 4,369,872 | 1/1983 | Sticht ........................... | 198/345.3 |
| 4,492,297 | 1/1985 | Sticht ........................... | 198/345.3 |
| 4,494,282 | 1/1985 | Ida et al. ...................... | 198/345.3 X |
| 4,515,264 | 5/1985 | Sticht ........................... | 198/465.2 X |
| 4,530,287 | 7/1985 | Sticht ........................... | 198/722 X |
| 4,534,546 | 8/1985 | Cattani ......................... | 198/345.3 X |
| 4,687,091 | 8/1987 | Sticht ........................... | 198/345.3 |
| 4,762,218 | 8/1988 | Sticht ........................... | 198/345.3 |

FOREIGN PATENT DOCUMENTS

| | | |
|---|---|---|
| 818295 | 10/1951 | Fed. Rep. of Germany . |
| 2640593 | 6/1977 | Fed. Rep. of Germany . |
| 2838686 | 3/1979 | Fed. Rep. of Germany . |
| 3134195 | 3/1982 | Fed. Rep. of Germany . |
| 3211444 | 9/1983 | Fed. Rep. of Germany . |
| 3423390 | 1/1986 | Fed. Rep. of Germany . |
| 3618584 | 12/1987 | Fed. Rep. of Germany ... 198/345.3 |
| 3807192 | 9/1988 | Fed. Rep. of Germany ... 198/345.3 |
| 2522565 | 9/1983 | France . |
| 2527965 | 12/1983 | France . |
| 2544647 | 10/1984 | France . |
| 406977 | 8/1966 | Switzerland . |
| 2153767 | 8/1985 | United Kingdom . |

Primary Examiner—Robert P. Olszewski
Assistant Examiner—Cheryl L. Gastineau
Attorney, Agent, or Firm—Collard & Roe

[57] ABSTRACT

An installation for processing components comprises a series of workpiece supports having receptacles for holding the components. A feed device moves the workpiece supports in a conveying direction, and a respective lateral guideway alongside each side of the workpiece supports includes guide elements for guiding the workpiece supports in the conveying direction, the feed device being separate from, and operable independently of, the lateral guideways. A pressing device at one of the lateral guideways is arranged to bias the workpiece supports towards the opposite lateral guideway and perpendicularly to the conveying direction whereby the workpiece supports are held without play between the guide elements of the lateral guideways.

12 Claims, 10 Drawing Sheets

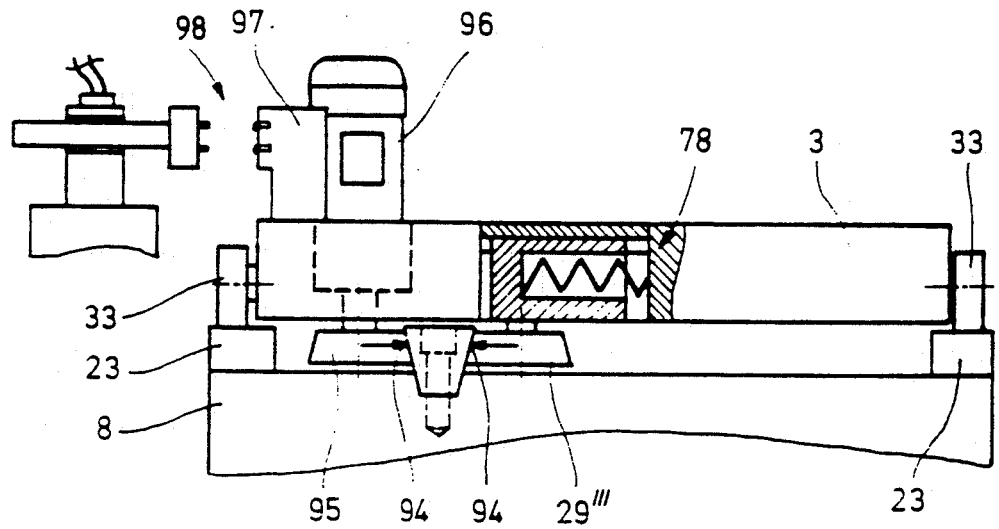
FIG.15
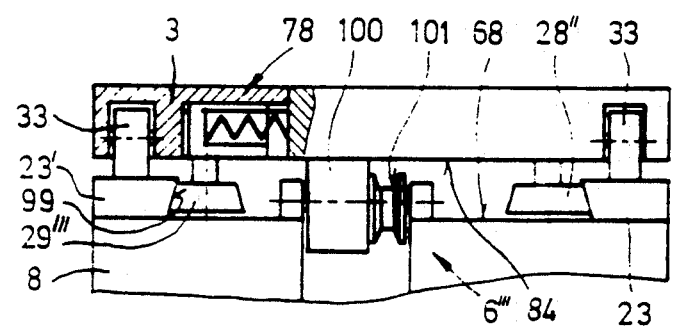
FIG.16
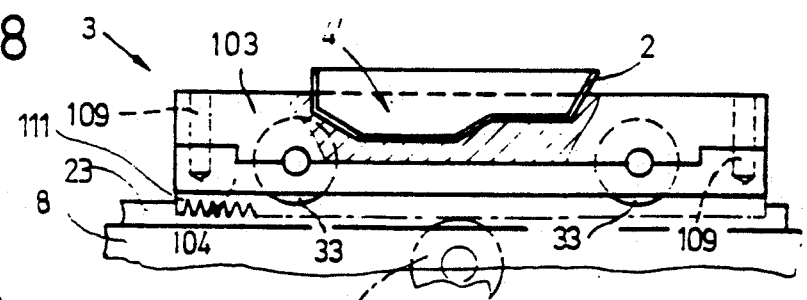
FIG.18
FIG.17
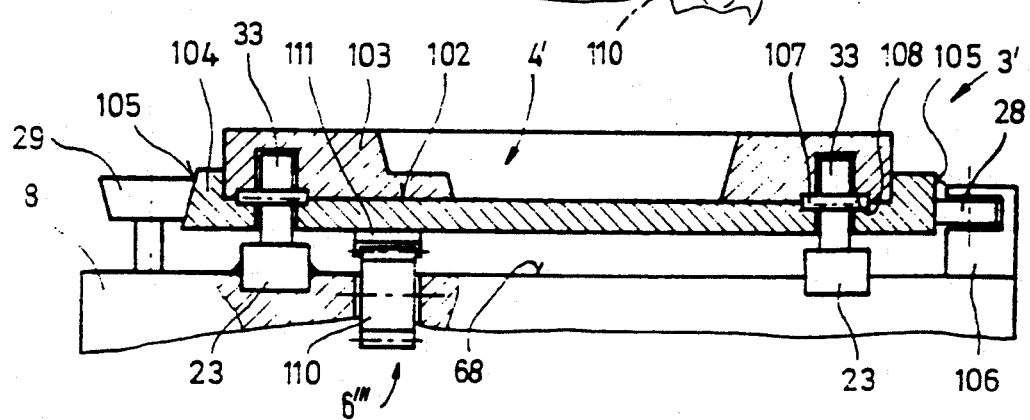

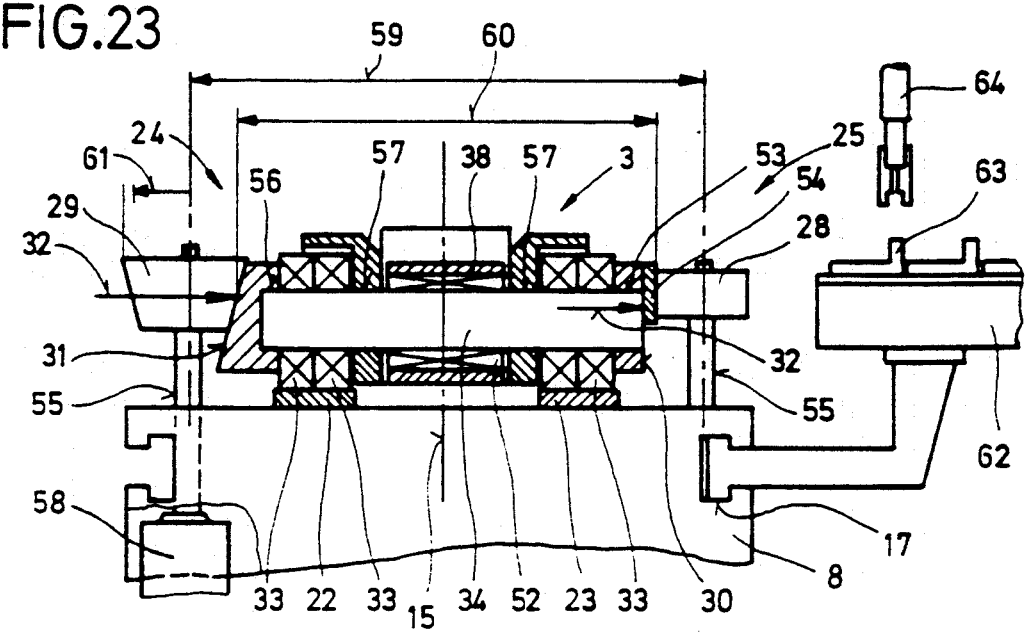

INSTALLATION FOR MANUFACTURING AND/OR ASSEMBLING COMPONENTS

CROSS-REFERENCE TO RELATED APPLICATION

This is a continuation of my copending U.S. patent application Ser. No. 474,833, filed Aug. 17, 1990, abandoned.

The invention relates to an installation for processing, i.e. machining and/or assembling components on workpiece supports, which are provided with receptacles to hold the components. The supports are guided on a vertical and/or lateral guideway and are conveyed by a feed device.

In such installations, basically a distinction is made between so-called loosely interlinked and rigidly interlinked workpiece supports. In the loosely interlinked installations, the workpiece supports are moved totally independently of each other along the installation and when one device fails in a single work station, the activity in the other work stations is almost unaffected over a certain period of time. In the rigidly interlinked installations, the workpiece supports are connected for common movement, so that in the case of disturbances in the region of one work station, all the workpiece supports and all the work stations are blocked. Each of the two types of installation has its specific range of use. The rigidly interlinked installations are used where only a few work stations are linked with each other. The loosely interlinked installations are mostly used for the interlinking of a large number of work stations, for example up to 40 work stations and over.

Various installations with loose interlinking have already become known—for example from my U.S. Pat. Nos. 4,681,043, 4,762,218, 4,619,205, 4,530,287 and 4,492,297, which have proved successful in practice for the interlinking of a large number of work stations. The workpiece supports are in each case guided independently of each other on vertical and lateral guideways comprising conveyor rollers pressed against the lateral faces of the workpiece supports, which provide a combined lateral and vertical guidance and conveyance of the workpiece supports, and position them exactly over the entire course of such an installation.

Furthermore, rigidly interlinked installations are known, in which the individual workpiece supports are connected via conveying chains—in accordance with DE-OS 26 40 593—. It has been difficult to mass produce such installations, or in each case to adapt them to a differing requirement with a different number of work stations. Moreover, the installing of the chain onto the assembly or machining devices arranged in the work stations was difficult.

Other known rigidly interlinked installations for machining and assembling components are formed by rotary tables which may also be interlinked with each other if required via additional conveying devices—e.g. in accordance with DE-OS 31 34 195. Such rigidly interlinked installations can not be expanded subsequently by additional work stations, and require a large space, especially in the arrangement of several work stations in series. In addition, the accessibility the construction and also the maintenance are difficult because of the compact arrangement of the assembly, handling or machining devices inside the rotary table.

The present invention solves the problem of creating an installation for machining and/or assembling components, which in a technically simple manner provides workpiece supports and guide devices for workpiece supports, which makes the system able to be adapted to differing conditions of use. Moreover, it is also possible with such installations to replace conventional rigid machining and/or assembling systems, which are designed for a single case of application.

According to the invention, the workpiece support is provided with support rollers, which are guided on the vertical and/or lateral guideway and, between the workpiece support and one of the two lateral guideways or between a lateral guideway and a machine table holding the latter, a pressing device is provided, which exerts a pressure in the direction of the opposite lateral guideway, whereby it is possible to give the workpiece support an exactly defined position at every location on its feed path, and hence also to position the equipment necessary for the machining and/or assembling devices, and equip them with positioning systems which make possible a rapid changeover from one piece of equipment to another.

The feed device for conveying the workpiece support is separate from the vertical and/or lateral guideway, whereby it is possible in a very simple manner to remove and introduce individual workpiece supports from and into, an automated continuous process, and to move them manually as required.

It is also advantageous if the lateral guideway is formed by support rollers arranged at a distance from each other along the guideway, which rollers are mounted on axes extending vertically to upper side of the housing parts wherealong the workpiece supports are conveyed, whereby continuous guide devices, which require a very high manufacturing accuracy can be dispensed with. The support rollers are positioned once and over a long period of use of the installation ensure the accuracy of the lateral guidance. In this embodiment, it is possible simply to arrange between the support rollers the controlling and regulating devices which are necessary for the monitoring and also the positioning of the workpiece supports. In addition, it is not necessary to position individual segments or modules of such an installation with a high degree of precision with respect to each other, because only the accurate position of the workpiece support on the module and in relation to the delivery—, operating— and handling equipment arranged on the module is important.

According to another embodiment, the support rollers are arranged on both sides of a conveyor chain, whereby with the use of the same structural elements, the workpiece supports may be guided in a straight line over distances of any length.

The support rollers may also be associated with a lateral face of the conveyor chain, and on the opposite longitudinal side a pressing device is arranged for the exerting of a compressive force in the direction of the support rollers. Any desired number of rollers may thus be mounted elastically, whereby all the workpiece supports rest without difficulty against support rollers arranged opposite the pressure rollers. An accurately defined position of the workpiece supports is thereby achieved without difficulty.

The pressing device may be formed by pressure rollers which are elastic in radial direction, and a distance between a relaxed pressure roller and the opposite lateral guideway is smaller than a width of the conveyor chain or the workpiece supports coupled therewith, whereby additional mechanical structural elements can be spared. Through the elasticity of the pressure rollers, the distance transverse to the conveying direction between the guide- and pressure rollers can be produced with little technical expenditure, and also the workpiece supports can have a greater width tolerance compared with other systems.

The pressure rollers and support rollers are arranged so as to be staggered with respect to each other in the conveying direction of the conveyor chain, whereby a better directional stability of the workpiece supports a quiet and vibration-free operation of the entire installation is achieved.

According to another embodiment, the pressure rollers and/or the support rollers are coupled with a drive, e.g. a drive motor or a chain— or belt drive, in which case the guiding— and feeding function is united in one structural element, whereby the entire installation is technically simplified.

It is also advantageous if the workpiece supports are constructed as chain elements and are connected with each other into a conveyor chain by means of link pins running parallel to a transport plane and perpendicularly to the conveying direction, and that there is associated with the conveyor chain a feed device formed by a stepping drive, because thereby a central feed drive is possible, from which at the same time a large number of workpiece supports can be moved along a conveying direction. This drive can also at the same time be designed as a positioning system for all the workpiece supports.

According to another embodiment, the workpiece supports are articulatedly connected with a revolving conveyor chain, and there is associated with the conveyor chain a feed drive which is constructed as a stepping device. This makes it possible to use a commercially available and very simple chain as conveyor chain and to couple the workpiece supports at any desired distances to chain elements, and hence to adapt the installation to the actual requirements.

One or more of the pressure rollers arranged on the workpiece support may be connected with a feed drive connected with an energy storage device arranged on the workpiece support, which device is connected with a coupling device for an energy supply device. In at least one work station a connection device connected with the coupling device from a further energy system is provided, whereby the installation can be designed so as to be variable in the timing of the conveyance of the individual work stations. It is, in addition, also possible, independently of a uniform speed of a conveyor chain, through the selection of differing speeds of the drive devices arranged on the workpiece support, to adapt the speed to the conveying path to be covered between the individual stations. Such installations are particularly suitable where for various reasons working areas have to be separated and therebetween longer conveying paths are to be covered. Through the selection of a high feed speed for these conveying paths, also the number of workpiece supports necessary for a cylic process can be minimized.

According to a further embodiment, it is additionally advantageous that there are associated with the workpiece supports on the underside facing the conveying plane friction rollers of a feed device, which rotate about axes extending parallel to the conveying plane and vertically to the conveying direction. This makes it possible to convey the workpiece supports also over regions which are not equipped with lateral guide devices. For example, this is advantageous if in such regions the workpiece supports are to be removed or inserted transversely to the conveying direction.

The lateral guideways may also be arranged on the workpiece support parallel to the conveying direction, and the guide elements cooperating with the lateral guideways may be arranged transversely to the conveying direction so as to be adjustable on the housing part. They are provided with a pressing device and have a length which corresponds to the length of the workpiece support. Commercially available machine parts can be used which are manufactured with a high degree of precision and in large numbers.

The pressing device may be associated with one part of the length of the lateral guideway. This makes it is possible to arrange a simple transverse conveying device for the workpiece supports, in order to move these to conveying paths or storage paths parallel to the conveying direction.

According to a further embodiment, entrainment elements, such as toothed racks are mounted on the underside of the workpiece supports and are engaged by drive gears particularly in conjunction with feed devices formed by stepping motors, this provides an accurate positioning of the workpiece supports.

The workpiece support may be constructed in several parts and a lower part is supported on rollers while an exchangeable upper part, has receptacles for the component. Such multi-part workpiece supports can be used for differing components—through the use of the upper parts provided with the corresponding receptacles.

According to a further embodiment of such multi-part workpiece supports, the axle journals of the rollers may be arranged rotationally symmetrically with respect to the joining plane of the workpiece support parts. Such workpiece supports can be manufactured with a high degree of precision, without additional machining in injection die moulds or die cast moulds.

For a better understanding of the invention, the latter is explained in further detail hereinafter by means of the preferred embodiments illustrated in the drawings, in which:

FIG. 15 shows a workpiece support in front view with a feed arrangement and a variant of a device for lateral and vertical guidance according to the invention;

FIG. 16 shows another embodiment of a feed arrangement on a workpiece support with a device for lateral and vertical guidance constructed according to the invention;

FIG. 17 shows a modified embodiment of a workpiece support in front view in section with devices constructed according to the invention for lateral and vertical guidance;

FIG. 18 shows a side view, partially in section of the embodiment of FIG. 17;

FIGS. 22 to 26 respectively show modifications of the embodiments illustrated in FIGS. 1, 3, 4, 5 and 14.

Figure 1:
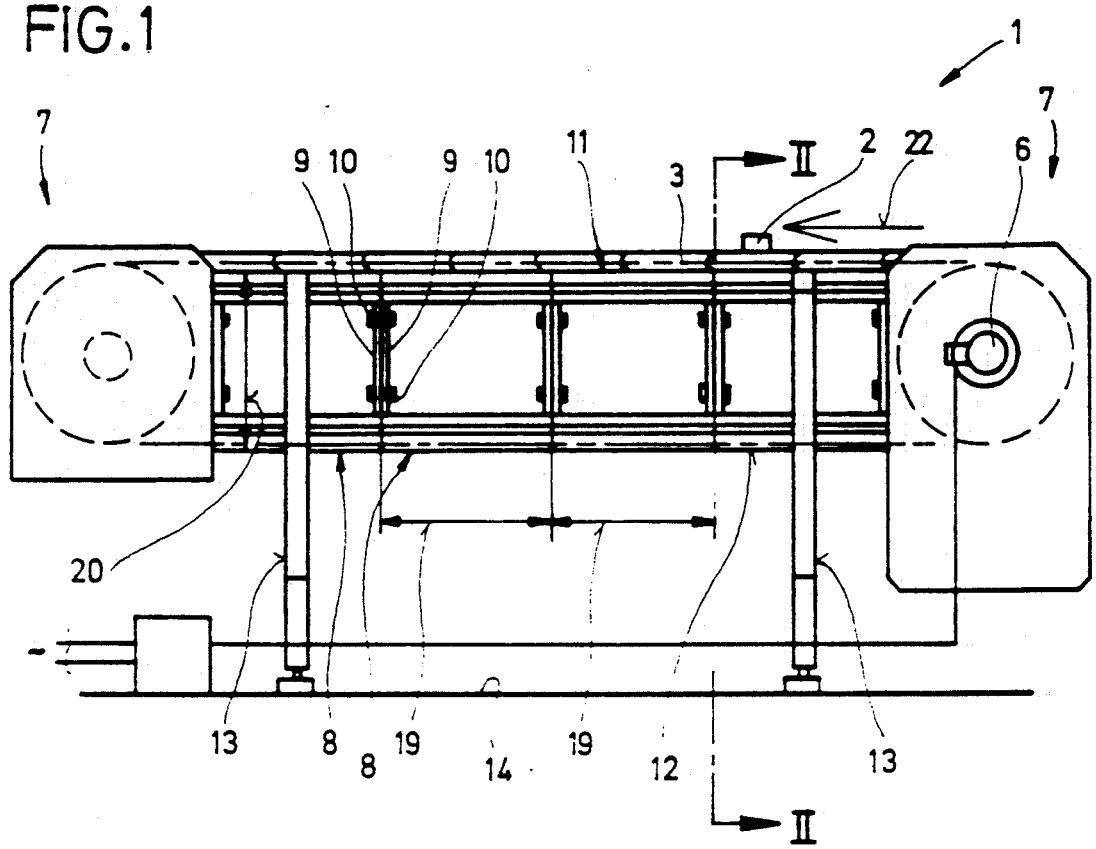
FIG. 1 shows an installation constructed according to the invention, in side view in simple schematic representation.
Figure 2:
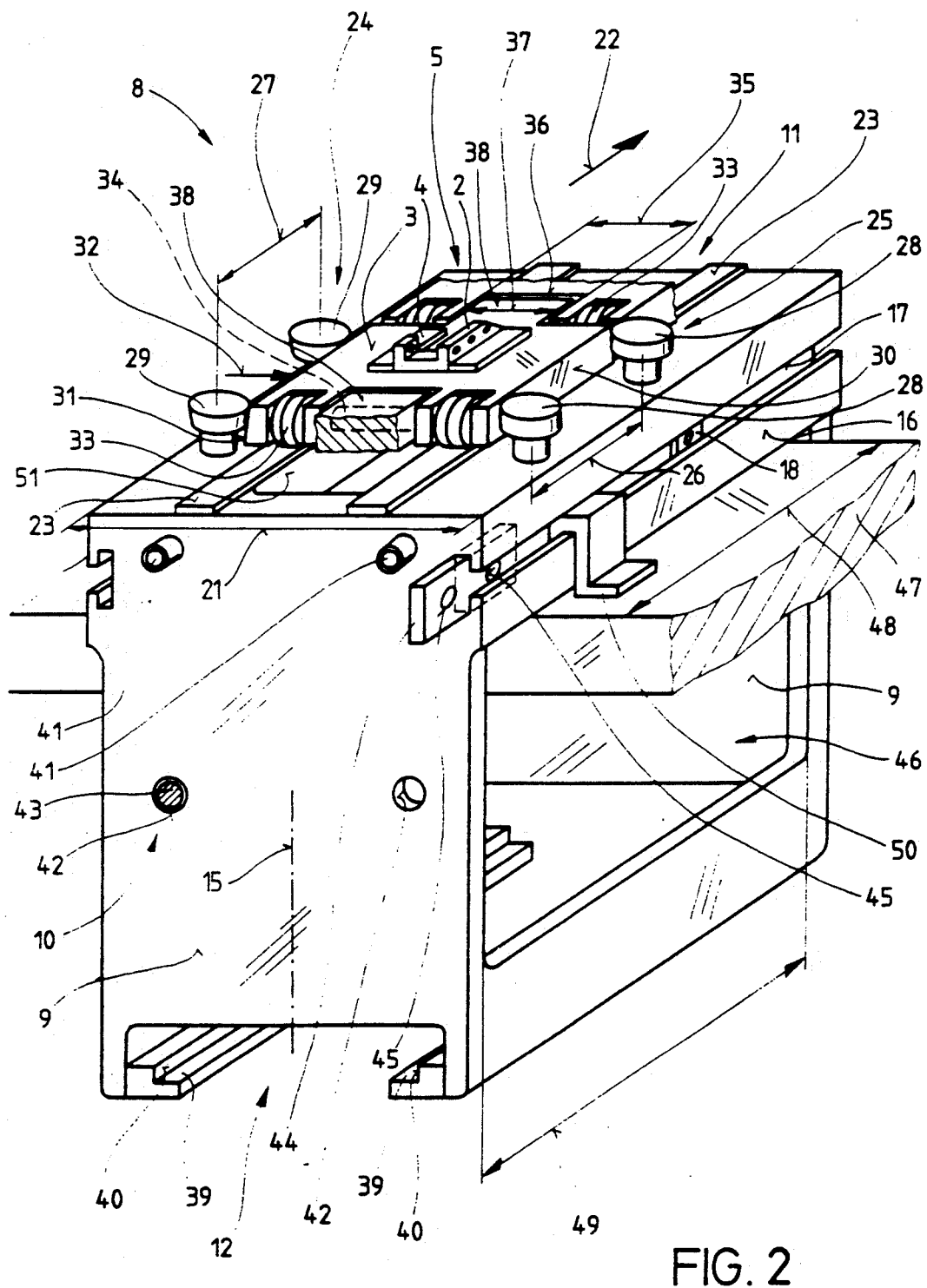
FIG. 2 shows a housing part of the installation according to the invention with interlinked workpiece supports and the devices for lateral and vertical guidance in diagrammatic and greatly simplified representation.
Figure 3:
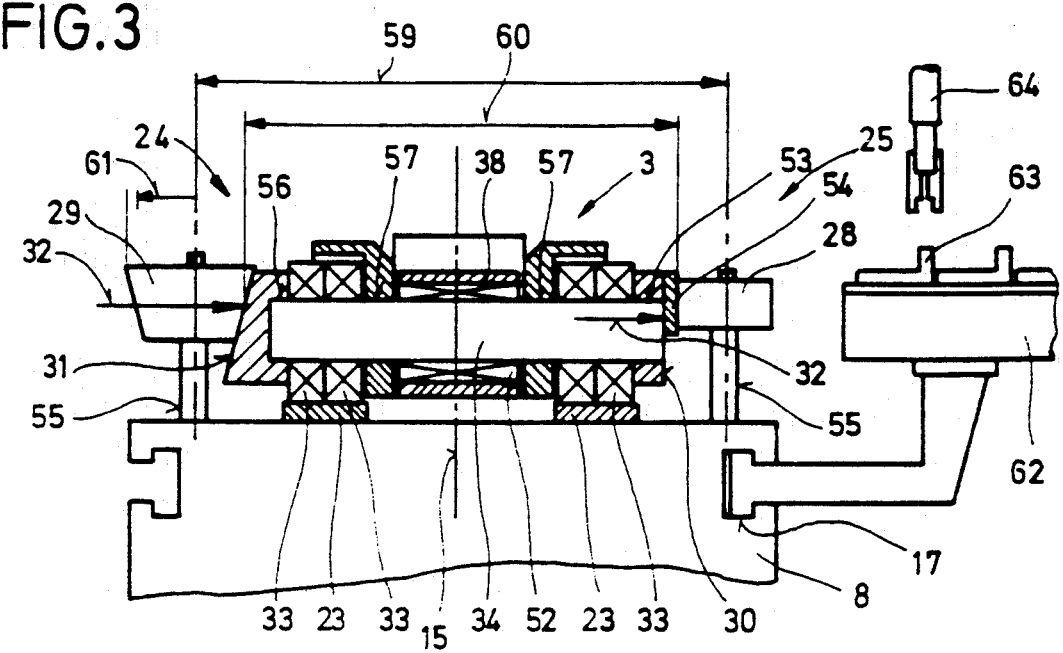
FIG. 3 shows the workpiece support according to FIG. 2 in front view partially in section and with the devices for lateral and vertical guidance associated therewith.

FIGS. 1 to 3 an installation 1 for the processing of components 2. These components 2 are arranged on workpiece supports 3. To hold the components 2 on the workpiece supports 3, receptacles 4 are connected with the workpiece support 3 or are integral therewith. The workpiece supports 3 in the present embodiment form a conveyor chain 5. A feed device 6 serves to move the conveyor chain 5, which feed device is arranged in the region of a deflection station 7 for the conveyor chain 5. Between the two deflection stations 7 there are several housing parts 8, which in the embodiment illustrated are constructed so as to be self-supporting. These housing parts 8 have front plates 9 facing each other, which may be connected with each other via guide and/or coupling devices 10 into a self-supporting housing unit. Upper and lower guideways 11,12 run perpendicularly to front plates 9, the upper course of conveyor chain 5 being guided in the guideway 11 and the returning course of the conveyor chain 5 being guided in guideway 12. Via the guide and/or coupling devices 10 between the individual housing parts 8, the guideways 11 and 12, which are arranged in a row adjacent to each other, form a continuous planar guide device for the conveyor chain 5. The installation 1 formed from the housing parts 8 and the deflection stations 7 is supported via support devices 13 on a support surface 14.

The support devices 13 are formed by L-shaped supports arranged in mirror image to a vertical plane of symmetry 15, with which side walls 16 of the housing parts 8 are connected. For simple attachment of the L-shaped supports on the lateral walls 16, longitudinal assembly strips 17 are provided, forming a continuous attachment device. These assembly strips 17 are formed, for example, by T-shaped grooves, into which blocks 18 with a cross-sectional shape matching the groove shape are inserted, which blocks on the ends facing the support devices 13 are provided, for example, with a thread, whereby by means of nuts the support devices 13 are pressed against the lateral walls 16 of the housing parts 8 and are fixed with respect thereto. An advantage of the use of such a continuous attachment device lies in that the support devices 13 can be positioned in any desired position along the installation 1, so as not to obstruct the arrangement of work stations or handling or delivery equipment associated therewith. Likewise, these continuous attachment devices can, however, also serve for the fixing of the end positions of delivery equipment or handling devices, whereby they are able to be used in a multiple manner.

As can be seen from the illustration in FIG. 1 and 2, the housing parts 8 have uniform dimensions, such as a length 19, a height 20 and a width 21. Thereby, it is readily possible to join the housing parts 8 together in a seamless manner and also to exchange individual housing parts 8 without difficulty. Through the continuous attachment device in the form of the assembly strip 17, it is thereby additionally made possible that in the exchanging of individual housing parts 8, the housing parts 8 immediately adjoining can be supported provisionally by means of support devices 13, so that for example the faulty housing part 8 or the work station arranged in the region thereof, can be simply replaced by a differently designed work station.

With a precise longitudinal alignment of this attachment device, it is also possible through the insertion of slides in the transition region between adjacent housing parts 8, to position these two housing parts by means of this slide both vertically and laterally and to fix them in their position. A suitable construction of the guide and/or coupling device 10 would make it possible for the individual housing parts 8 to be dismantled or to be built in vertically to the feed direction of the workpiece supports, as indicated by arrow 22.

As can be additionally seen, the support devices 13 can be equipped with foot elements which are adjustable vertically to the support surface 14, in order to make possible a horizontal arrangement of the installation independently of unevenness of the support surface 14.

In FIG. 2 a housing part 8 is shown. The guideway 11 supports the upper course of the conveyor chain 5 and comprises guide strips 23 for the vertical guidance of the chain elements forming the workpiece supports 3. Guideways 24,25 serve for lateral guidance and are formed by support rollers 28 and pressure rollers 29 arranged one behind the other at a distance 26 and 27 in the conveying direction—arrow 22. The support rollers 28 are associated with a lateral face 30 of the workpiece support 3 and the pressure rollers 29 are associated with a lateral face 31 lying opposite this lateral face 30. Pressure rollers 29 exert a pressure onto the workpiece supports 3 indicated by an arrow 32 in the direction of the support rollers 28 so that the workpiece supports 3 assume an exact position transversely to the direction of movement according to arrow 22, which position is accurate down to a fraction of a millimetre. The exact vertical guidance is ensured here by the guide strips 23.

In order to make possible an exact vertical and lateral guidance of the workpiece supports 3 over a long period of time, the latter are supported on the guide strips 23 via rollers 33. These rollers 33 are mounted on an axis serving as link pin 34. The link pin 34 connects two workpiece supports 3 which directly succeed each other for common movement in the conveying direction. The vertical guidance of the workpiece support 3 is effected by rollers 33 and the rollers 33 associated with the immediately preceding workpiece support, each workpiece support 3 resting on these rollers 33 by means of hinge pins 34. In order to make possible an independent lateral positioning for each workpiece support 3, a width 35 of a recess 36 in the workpiece support 3 is greater than a width 37 of a coupling port 38 mounted on the link pin 34. This makes it possible to displace immediately succeeding workpiece supports laterally relative to each other and the lateral adjustment of the workpiece supports 3 is therefore only influenced by the position of the lateral guideway 25 and not by the position of the conveyor chain 5 as such.

As can be further seen from FIG. 2, the housing part 8 is constructed in one piece and on its underside has a guideway 12, formed by guide strips 39, in which the returning course of the conveyor chain 5 is guided via the rollers 33. Vertical guide surfaces 40 serve for the lateral guidance of the workpiece supports 3 along guide strips 39. The two parts receiving the guideways 11 and 12 are connected with each other via the front plates 9. In this front plate 9 there are arranged fitting pins 41 and bores 42 for screws 43, which together form the guide and/or coupling device 10. In addition, the continuous attachment device, which is formed as an assembly strip 17 with a T-shaped cross-section, is shown. Instead of the fitting pins 41, a coupling strip 44 guided in the assembly strip 17 can be used for connecting the housing parts 8 at the same level. If this coupling strip 44 is provided with bores 45, screws inserted therein can couple adjacent housing parts 8 to each other.

A free space 46 is delimited by the guideways 11,12 and the front plates 9, in which free space a table plate 47 is arranged.

A length 48 of the table plate 47 is smaller than a length 49 of the free space 46. This makes it possible to a limited extent, to displace and position the table plate 47 in the feed direction—arrow 22—with respect to the housing part 8. The guidance and attachment of the table plate 47 can take place, as indicated diagrammatically, by means of retaining clips 50, which are suspended in the assembly strip 17.

The drawing also shows an opening 51 between the guide strips 23 through which access is possible to the workpiece supports 3 from below. Thereby, additional supports of the workpiece support 3 can be provided, especially in those stations which in the assembly of parts 2 necessitates a relieving of the rollers 33 of the workpiece support 3. It is also possible to provide rotatable parts in the workpiece support 3, which can be adjusted into different rotational positions by drives acting from below.

In FIG. 3, the arrangement of the link pin 34 and its mounting in the coupling part 38 and in the workpiece support 3 is shown. The link pin 34 is supported in the coupling part 38 in a bearing 52, which preferably is a roller- or needle bearing. It is journaled in a bore 53 in the lateral face 30 of the workpiece support 3. There is arranged in front of the end of the link pin 34 in the region of the lateral face 30, a lateral guide strip 54, which fixes it against movements transversely to the feed direction. This lateral guide strip 54, which may consist for example of a hardened metal strip, serves as a support for the support rollers 28, which are rotatable about vertical axis 55, which in turn are supported in the housing part 8. In the region of the opposite lateral face 31, the link pin 34 is mounted in a blind bore 56. Further bores 57 in the workpiece support 3 are bearings to receive and hold the link pin 34. Between these bores 57 and the blind bore 56 and the bore 53, respectively two rollers 33 are arranged adjacent to each other. Owing to the selected construction, it is therefore possible in a simple manner to drive the conveyor chain 5 almost free of play and free of wear over a long period of time, because the guidance of the workpiece support 3 with respect to the guide strips 23 takes place in the form of a rolling friction by the rolling of the rollers 33 on the guide strips 23. Likewise, the movements between the workpiece supports 3 which immediately succeed each other, are carried out principally in the region of the deflection station 7 via the bearing 52, so that a rolling friction and not a sliding friction takes place, in this region too.

As can be further seen from FIG. 3, the lateral face 31 runs obliquely to the plane of symmetry 15. The distance of this lateral face 31 from the vertical plane of symmetry 15 decreases as its distance from guide strip 23 increases. Likewise, the pressure rollers 29 which are associated with the lateral face 31 are tapered, narrowing towards the housing part 8. The pressure rollers 29 are likewise rotatably mounted on vertical axes 55, which are secured in the housing part 8. In the modified embodiment illustrated in FIG. 23, these axes 55 of the pressure rollers 29 are coupled to a drive motor 58, which supports the feed movement of the feed device 6.

In order to make possible a guidance of the workpiece supports 3 free of play along the lateral guideway 25 formed by the support rollers 28, a distance 59 between the axes 55 of the pressure rollers 29 and the support rollers 28 is smaller than a width 60 of the workpiece support 3 including a radius of the support roller 28 and a radius 61 of the pressure roller 29. Through the pressure roller 29, which is elastically deformable in radial direction, a pressure running in the direction of the arrow 32 is exerted on support rollers 28 so that the workpiece support 3 rests against the support rollers 28 in a play-free manner. At the same time, through the tapered construction of the pressure rollers 29 a pressure is also exerted in the direction of the guide strips 23, which leads to the workpiece support 3 resting in a play-free manner on these guidestrips 23. Thus, despite the construction of the workpiece support 3 as a chain element, a play-free guidance thereof is possible along the vertical and lateral guideways 23 and 25.

As is further shown, it is possible through the assembly strip 17 to exactly position an end of a linear conveying track 62 of a delivery apparatus in its position with respect to the housing part 8, so that on removal of individual parts 63, the latter can be picked up by a diagrammatically indicated gripper 64 always exactly at the correct location and brought to be deposited onto the workpiece support 3.

Through this supporting of the linear conveying track 62 via a supporting bracket in the assembly strip 17, a positioning of the linear conveying track is possible both vertically and also in the direction transversely to the direction of movement and of course also in the direction of movement.

Figure 4:
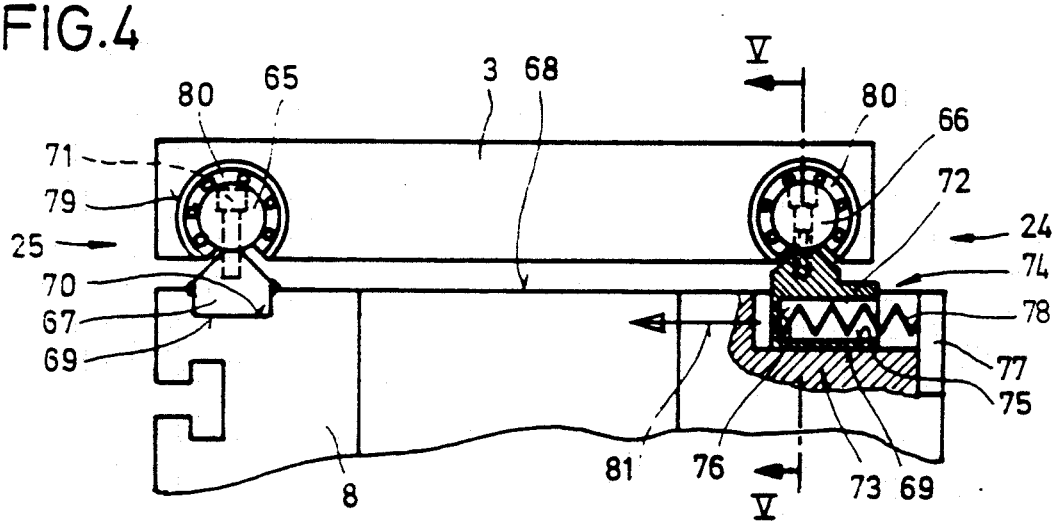
FIG. 4 shows one embodiment of a part of an installation constructed according to the invention in front view with the device for lateral and vertical guidance.
Figure 5:
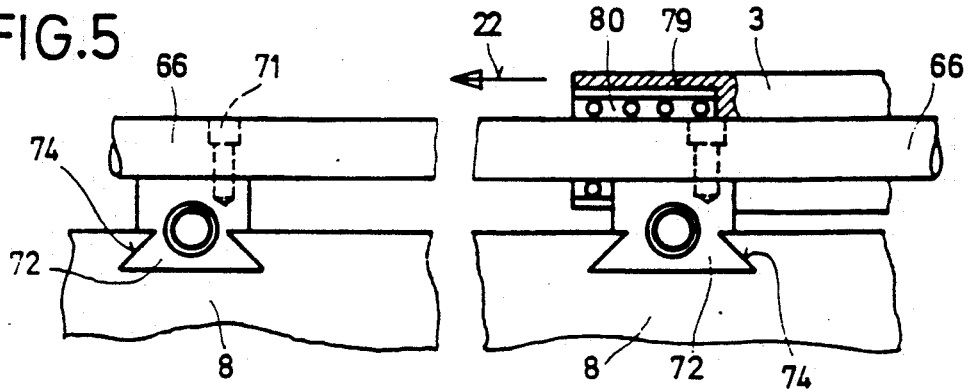
FIG. 5 shows a side view of the device for lateral and vertical guidance, partially in section according to the lines V—V in FIG. 4.

FIGS. 4 and 5 illustrate another embodiment of a play-free lateral guideway for the workpiece support 3. Guide rods 65,66 are arranged on housing part 8 are spaced apart from each other transversely to the conveying direction—arrow 22—of the workpiece supports 3. The guide 65 is arranged on the housing part 8 with a support piece 67 at a distance from top face 68 of the housing part. On its end opposed to the guide 65, the support piece 67 has a base 69, which is arranged in a recess 70 of the housing part 8. The support piece 67 is tapered in the shape of a saddle roof in the direction of the guide 65, and is connected with the guide 65 on its flattened part which matches the outline of the guide 65, with connection means, such as screws 71, for example. The guide 66 is likewise arranged on a support piece 72 whose base 69 is displaceable in a guide arrangement 74, such as for example a dovetail guide, which is formed by a recess 73 running perpendicularly to the longitudinal axis of the guide rod 66. In a bore 75 arranged parallel to the guide arrangement 74 in the support piece 72, between a front end 76 of the bore 75 and an abutment 77 arranged on the housing part 8, there is arranged a pressing device 78 illustrated as a coil spring. In recesses 79 of the workpiece support 3 there are arranged at a distance corresponding to the mean distance of the guides 65,66, guide elements 80, e.g. linear ball bearing bushes.

Through the transverse displaceability of the guide 66 in the guide arrangement 74 and the pressing device 78, the guide element 80 is pressed in a play-free manner against the fixed guide 65 through the pressure force exerted by the spiral spring in the direction of an arrow 81. Thereby, the play which is necessitated by manufacturing technique between the guides 65,66 and the guide elements 80 is balanced out and in relation to the fixed guide 65 an accurately defined position of the workpiece support 3 is achieved.

As can be further seen from FIGS. 24 and 25, the guideways 24,25 can be interrupted in a region in which a play-free guidance is not so important, and can be replaced by guide strips 23 and guide rollers 33. In order to be able to continue from such a region again to a region with play-free guidance, the beginning of guide 66 has the shape of truncated cone facing in a direction opposite to the conveying direction—arrow 22—, whereby the workpiece support 3 reaches the region of play-free guidance smoothly.

Of course, however, it is also possible as represented in FIG. 5, to construct the guides 65,66 so as to be continuous. In such a case, the guideways 11,12 and the rollers 33 can be dispensed with.

Figure 6:
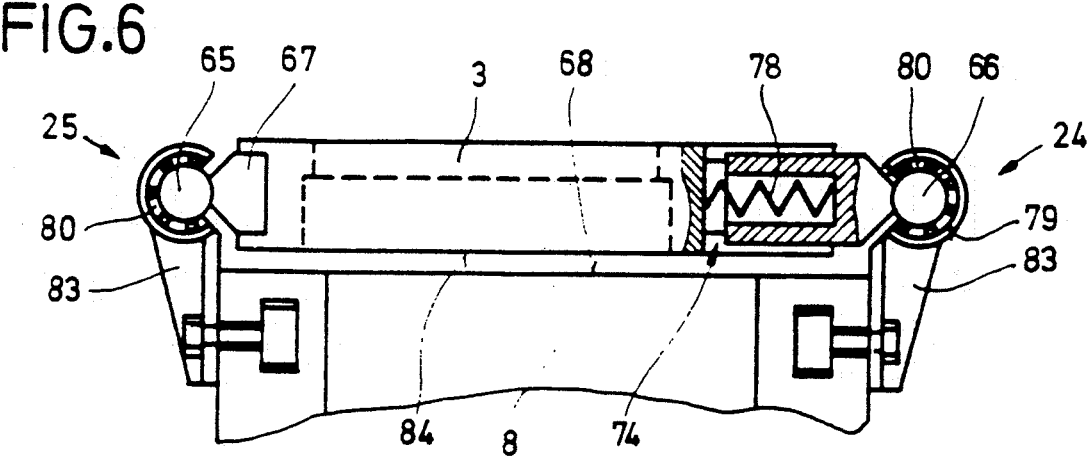
FIG. 6 shows another embodiment of a part of an installation constructed according to the invention, with a workpiece support in front view and of the device for lateral and vertical guidance.

In FIG. 6, the guideways 24,25 are also formed by guide rods 65, 66 but they are arranged on the lateral edges of the workpiece support 3. Again, guide 65 is arranged on a support piece 67 so as to be rigid against the workpiece support 3. On the opposite lateral edge of the workpiece support 3, the guide 66 in the workpiece support 3 is slidably mounted via a pressing device 78 in a guide arrangement 74 arranged at right angles to the longitudinal axis of the workpiece support 3. Detachably connected with the housing part 8 and at a distance above its top surface 68, supporting elements 83 with recesses 79 for guide elements 80, e.g. linear ball bearing bushes, are arranged, whereby a free space between the top surface 68 and the underside 84 of the workpiece support 3 is formed, so that individual parts which have fallen down can not impede the conveyance of the workpiece supports. The supporting elements 83 with the guide elements 80 arranged therein are spaced in the conveying direction a distance which is smaller than half the length of the guides 65 determined by the length of the workpiece support 3. Thereby it is ensured that the workpiece support 3 is guided so as to be free of play in every position by the guide elements 80 associated with the guides 65,66, under the pressure of the spring constituting pressing device 78.

Figure 7:
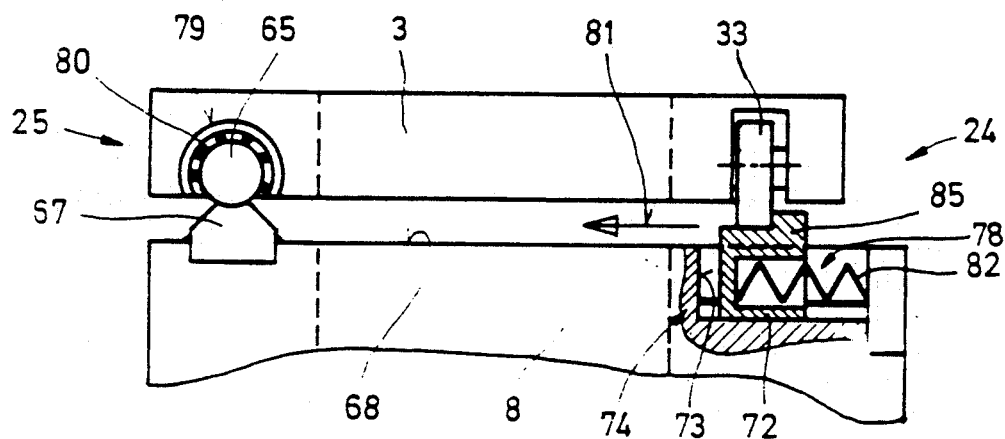
FIG. 7 shows a workpiece support in front view with a device according to the invention for lateral and vertical guidance with a part of an installation constructed according to the invention.

In FIG. 7 the guideways 24,25 are arranged on the housing part 8 parallel to the conveying direction of the workpiece support 3. A guideway 25 again is formed by guide rod 65, which is arranged fixedly on a support piece 67 on the housing part 8. There is associated with the guide 65 a guide element 80, which is arranged in a recess 79 of the workpiece support 3. arrangement 74 is arranged opposite guide rod 65 in the housing part 8 in a recess 73, which guide arrangement slidably supports a support piece 72 via a pressing device 78 at right angles to the conveying direction. Support pieces 72 are spaced from each other in the conveying direction and carry guide strips 85. These, together with rollers 33 arranged in the workpiece support 3 and rotatably mounted on axes extending parallel to the top surface 68 and perpendicularly to the conveying direction of the workpiece support 3, form the vertical and/or lateral guideway 24. Guide strip 85 can be adjusted transversely to the conveying direction by coil spring 82 constituting pressing device 78 and carries with it the workpiece support 3 via rollers 33 associated therewith. This displacement force in the direction of the arrow 81 brings about that the guide 65 is placed free of play against the guide elements 80 and the latter in turn are placed free of play against the recesses 79, so that a play-free lateral and vertical guidance of the workpiece support 3 is achieved.

Figure 8:
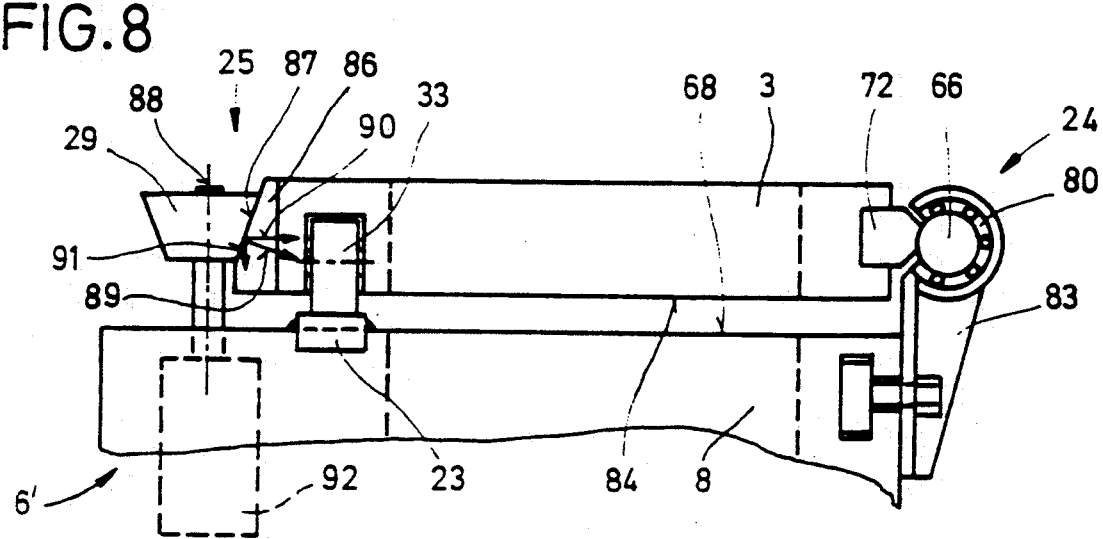
FIG. 8 shows a modified embodiment of a workpiece support in front view with a lateral and vertical guideway constructed according to the invention, and with a feed arrangement.

FIG. 8, the guideway 24 of workpiece support 3 is formed by guide rod 66 running in the conveying direction and the guide elements 80 associated therewith. On the housing part 8, supporting elements 83 are arranged spaced from each other in the conveying direction and support linear ball bearing bushes 80, which are associated with guide 66 fixedly connected via the support piece 72 with the lateral edge of the workpiece support 3. On the opposite lateral edge of the workpiece support 3, a wedge-shaped guide strip 86 is arranged, the face 87 of which forms an acute angle with the underside 84 of the workpiece support 3. Pressure rollers 29 of feed device 6' engage the inclined face 87, the longitudinal central axes of which are arranged at right angles to the top surface 68. In order to make possible a play-free guidance of the workpiece supports 3 along the guideway 24, the pressure rollers 29 are elastically deformable in radial direction. Thereby a pressure in the direction of an arrow 89 is brought about, which is divided into a force component 90 and a force component arrow 91. Force component arrow 90 compensates for play along the vertical and/or lateral guideway 24, whereby the latter forms a predetermined reference line or position.

The force component—arrow 91—prevents a lifting of the rollers 33 from the guide strip 23. As indicated by dashed lines, each of these pressure rollers 29, which are spaced from each other in the conveying direction, has associated therewith its own drive 92. However, it is also possible to associate with a number of pressure rollers 29 a common drive, e.g. a chain drive.

Figure 9:
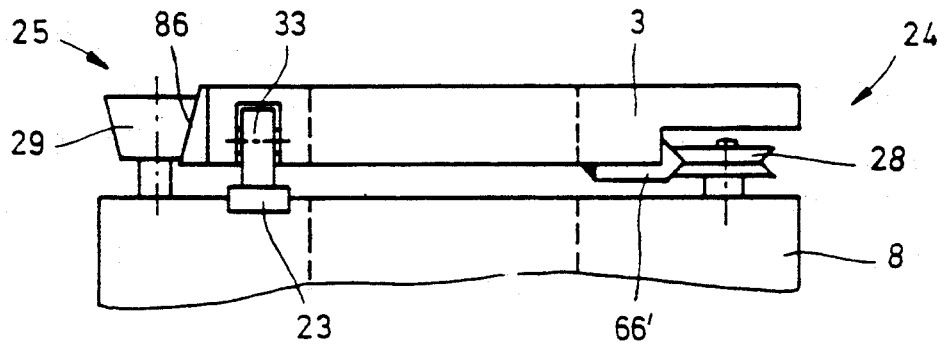
FIG. 9 shows yet another embodiment of a workpiece support in front view and a device according to the invention for lateral and vertical guidance.

FIG. 9 illustrates yet another embodiment of guideways 24,25 of a workpiece support 3 along a conveying direction. Along the housing part 8 and spaced from each other in the conveying direction there are arranged support roller 28, mounted rotatably about vertically axes. On the underside of the workpiece support 3 there are arranged guides 66' which are matched to the V-shaped section of the support rollers 28. Transversely to the conveying direction and at a distance from the guide rollers 28, pressure rollers 29 are mounted so as to be rotatable about vertical axes in the housing part 8, and which have a section in the form of a truncated cone narrowing towards the top surface 68 of the housing part 8. Close to the guide strips 86 associated with the pressure rollers, rollers 33, which are rotatably mounted about horizontal axes, are arranged on the workpiece support 3, with which rollers guide strips 23 are associated on the housing part 8. Elastic pressure rollers 29 and support rollers 28 engaging the guide 66 assume a play-free vertical and/or lateral guidance 24 by pressing the guide 66 against the support rollers 28.

Figure 10:
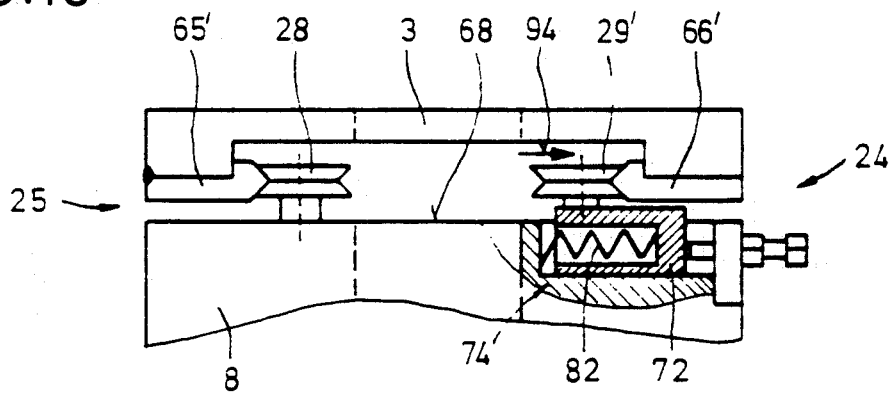
FIG. 10 shows a workpiece support in front view with a part of an installation constructed according to the invention and with the device for lateral and vertical guidance.
Figure 11:
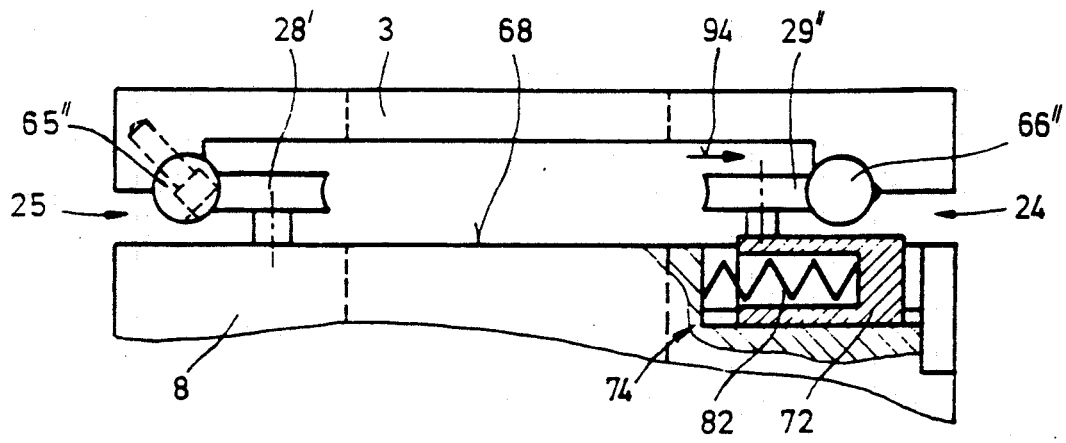
FIG. 11 shows a further embodiment of a workpiece support in front view with a device according to the invention for lateral and vertical guidance.

In FIGS. 10 and 11, guideways 24,25 for a workpiece support 3 are formed by guides 65'66' on the workpiece support 3. On the housing part 8, support rollers 28 are rotatably mounted about axes arranged vertically with respect to top surface 68. There are associated therewith guides 65' spaced from each other on the workpiece support 3 in the conveying direction. Guides 66' are arranged on the workpiece support 3, opposite guides 65' and are engaged by pressure rollers 29 are associated, which are rotatably mounted on support pieces 72 on axes extending vertically to top surface 68. The support pieces 72 are slidably arranged in a guide arrangement 74 perpendicularly to the conveying direction and in the direction of an arrow 94. The spiral spring 82 exerts a pressure force against the guide 66 and hence compensates for play in the guideway 25, whereby the fixed guide 65' together with the support rollers 28 forms the reference position. As illustrated, the guides 65'66' may have v-shaped cross-sectional shapes and the support rollers 28 and pressure rollers 29 have a running face which is adapted to the guides 65'66'. However, as shown in FIG. 11, guides 65"66" may be of round cross section and support and pressure rollers 28', 29" may have conforming arcuate circumferences engaging the guides direction.

Figure 12:
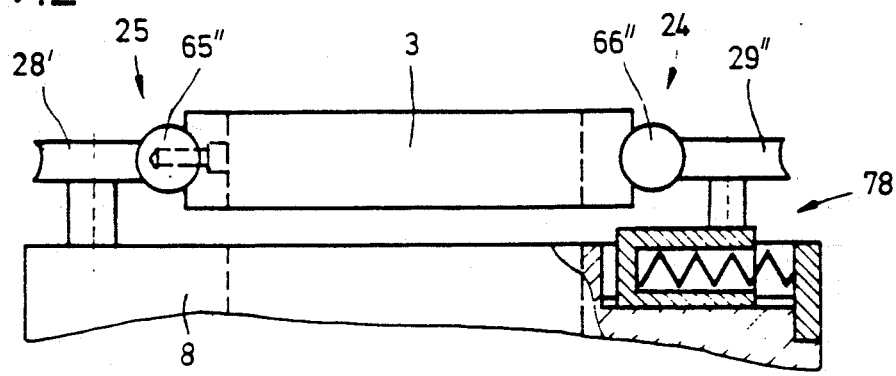
FIG. 12 shows a workpiece support in front view with a variant of a lateral and vertical guideway constructed according to the invention.
Figure 13:
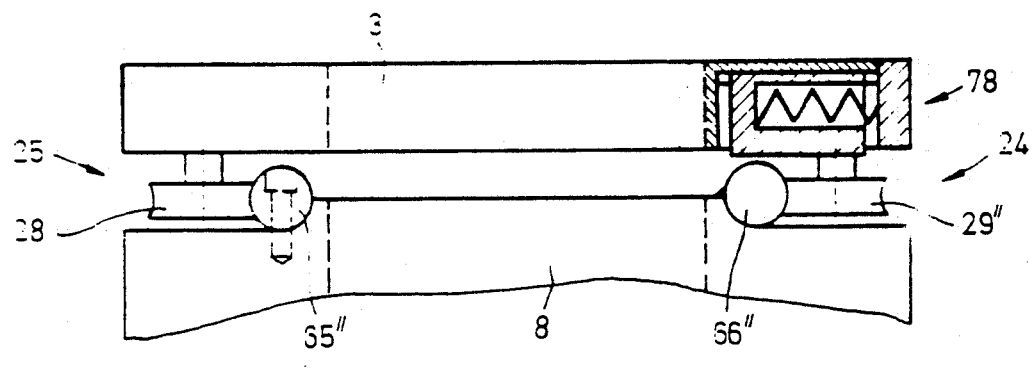
FIG. 13 shows another embodiment of a workpiece support in front view with a lateral and vertical guideway according to the invention.

In FIGS. 12 and 13, different arrangements of support rollers 28' pressure rollers 29" and guides 65"66" are illustrated. The rollers are mounted on the outside and hold the guides 65,66 therebetween, the guides being mounted on the workpiece support 3 as in FIG. 12, or on the housing part 8, as in FIG. 13, and the support rollers and pressure rollers 29 being respectively mounted on the housing part and the workpiece support. The guidance functions in the same manner as described in connection with FIGS. 10 and 11. pressure rollers 29, a play-free guidance of the workpiece supports 3 in the conveying direction is achieved, and through the fixed support rollers 28, a reference position is formed.

Figure 14:
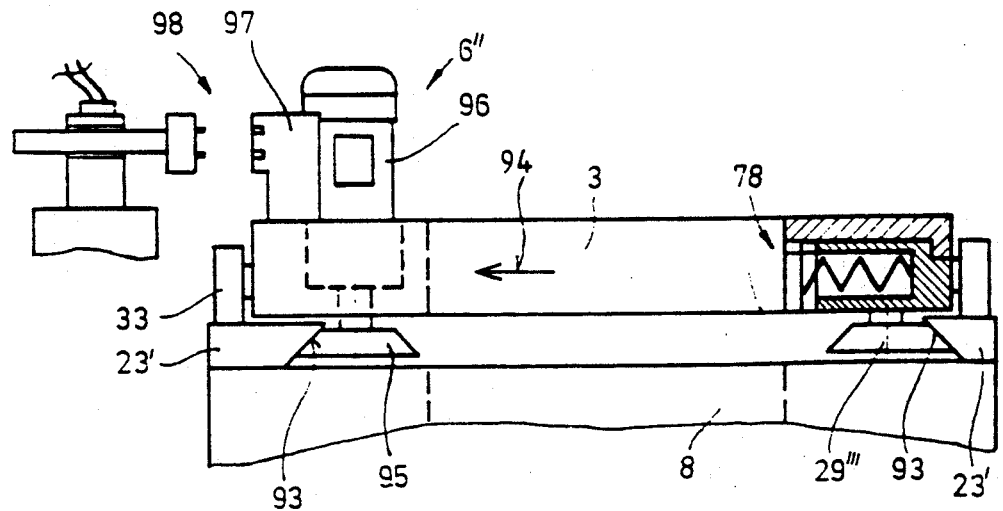
FIG. 14 shows another embodiment of a workpiece support in front view with devices according to the invention for lateral and vertical guidance, and with a feed arrangement.

FIGS. 14 and 15 show further arrangements of guideways 24,25 for the play-free guidance of workpiece supports 3 and of feed device 6". Rollers 33 are rotatably mounted on the lateral edges of the workpiece supports 3 and engage guide strips 23', which are arranged on the housing part 8 in the conveying direction. Inclined contact surfaces 93 of the guide strips 23' are engaged by pressure rollers 29" which are rotatably mounted about vertical axes. The bias exerted by pressing device 78 on the pressure rollers 29" and the reaction force—arrow 94—opposing the pressure force assure a play-free guidance of drive rollers 95 of the workpiece supports 3 along inclined contact surfaces 93 of the guide strip 23'. Feed device 6" comprises drive rollers 95 rotated about vertical axes by a motor 96 mounted on workpiece support 3. An energy supply device 98 may be coupled to a storage device 97 at specifiable intervals of time, in order to supply it with the energy necessary for the operation of the motors 96. The energy storage device arranged on the workpiece support 3 may be for example a battery or a store for a pressure medium, for example hydraulic oil or compressed air.

Figure 26:
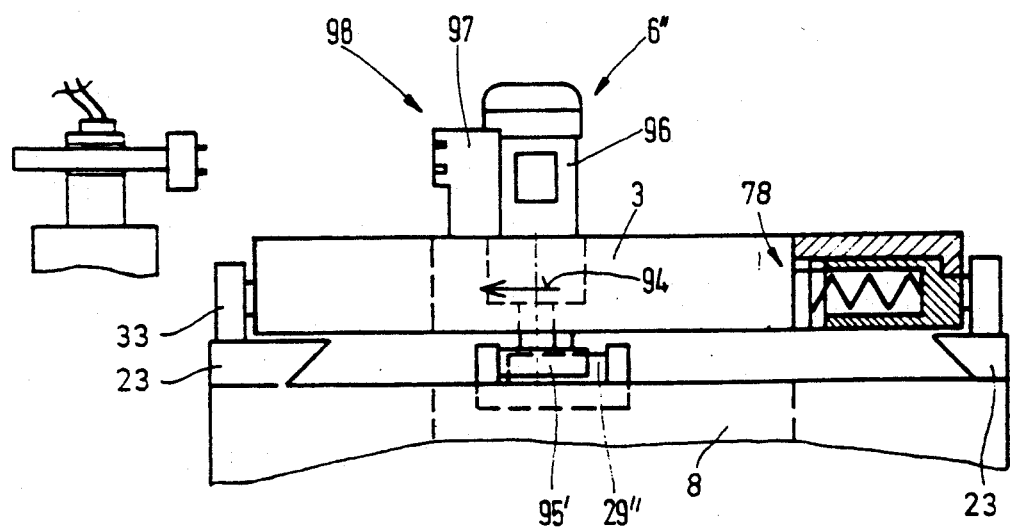

FIG. 26 shows a modification of the embodiment of FIG. 14, wherein the pressure roller 29''' and drive roller 95' are arranged in a U-shaped recess open in the direction of workpiece support 3. The recess may have another cross-section for a play-free lateral guidance of the workpiece supports.

In FIG. 16, the workpiece support 43 is supported via rollers 33 on guide strips 23' arranged on the housing part 8, and is movable along a conveying direction. The facing lateral faces 99 of the guide strips 23' are arranged obliquely and inclined toward each other of the housing part 8 a smaller space is produced between the inclined lateral faces 99 of the guide strip 23' than a space on the face 68. Associated with the lateral faces 99 are support rollers 28" which are rotatably mounted about vertical axes on the workpiece support 3, and having a surface in the shape of a truncated cone matched to the inclination of the lateral face 99. At a distance from the support rollers 28, there are associated with the further guide strip 23' on the workpiece support 3, pressure rollers 29''' which are displaceable via a guide arrangement and a pressing device 78 transversely to the conveying direction. Thereby, a play-free guidance of the workpiece supports 3 is achieved. Feed device 6''' for the workpiece supports 3 comprise cylindrical friction rollers 100 rotatable about horizontal axes. To achieve the frictional values necessary for the conveying of the workpiece supports, a covering having a high friction coefficient is preferably arranged on the surface of the friction rollers 100. The distance between the friction rollers 100, which are arranged one behind the other in the conveying direction, is smaller than the length of the workpiece support 3, so that at least one friction roller 100 engages the underside 84 of the workpiece support 3. The friction rollers 100 may be driven by a continuous driving member 101, e.g. a V-belt, flat belt or a chain, with which there is associated a drive motor. However, it is also possible to associate an individual drive with each friction roller 100. Thereby it is possible to drive the friction rollers 100 at different rotational speed rates and hence to operate the system in a very flexible manner.

In FIGS. 17 and 18, a multi-port workpiece support 3' is illustrated, which is divided by a horizontal plane of division 102 into an upper part 103 and a lower part 104. There are arranged on the lateral edges of the lower part 104 guide faces 105 engaged by support rollers 28 and elastically deformable pressure rollers 29. The support rollers 28 are rotatably mounted on vertical axis and are spaced from each other in the conveying direction in a strip 106. Rollers 33 of the workpiece support 3 engage the guide strips 23. The rollers 33 are rotatably mounted with horizontal axle journals 107 in recesses 108 arranged symmetrically with respect to the plane of division 102. In the upper part 103, the recess 4' for the component 2 is arranged and pins 109, e.g. cylindrical pins, position the parts with respect to each other. Thereby a rapid changeover of the workpiece supports 3 for components 2 with different shapes is possible. The feed device 6'''' of the workpiece supports 3 is, as illustrated, formed by a driven driving gear 110 which is rotatably mounted in the housing part 8 about a horizontal axis and engages toothed wheel, a cam 111, e.g. a rack 111, which is arranged on the underside of the lower part 104 and this feed device makes possible a displacement or adaption of the position of the workpiece support, transversely to the direction of movement, to the lateral guideways and the support rollers 28, without impending the conveyance of the workpiece supports.

Figure 19:
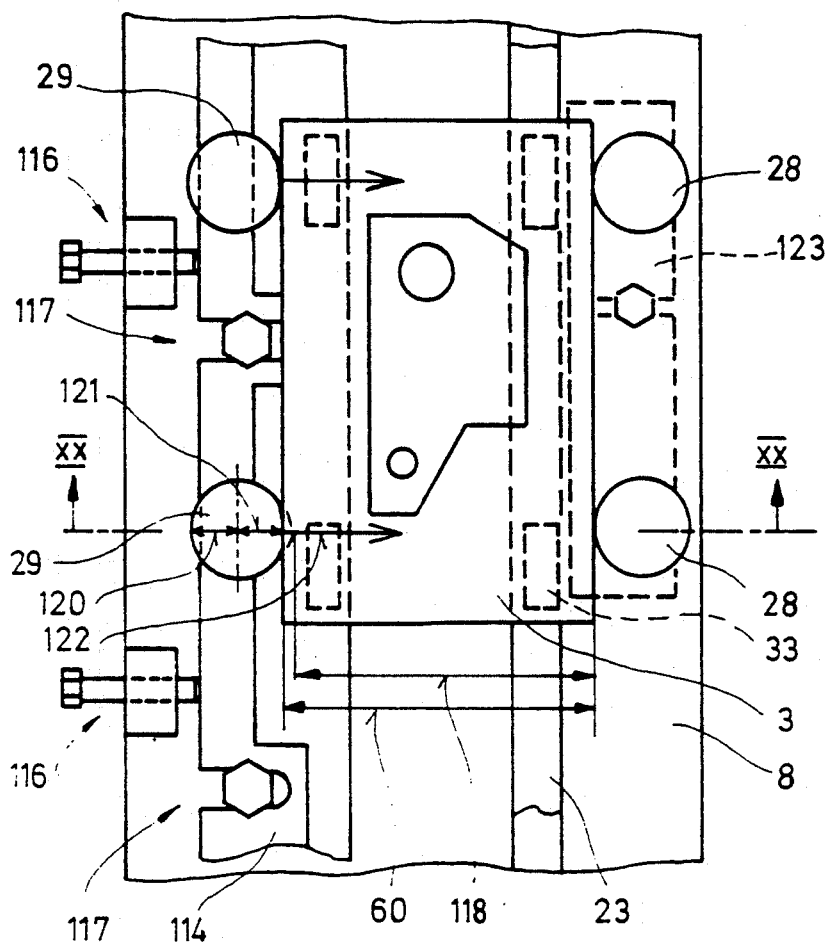
FIG. 19 shows another embodiment of an installation constructed according to the invention, with a workpiece support in plan view and with the device for lateral and vertical guidance.
Figure 20:
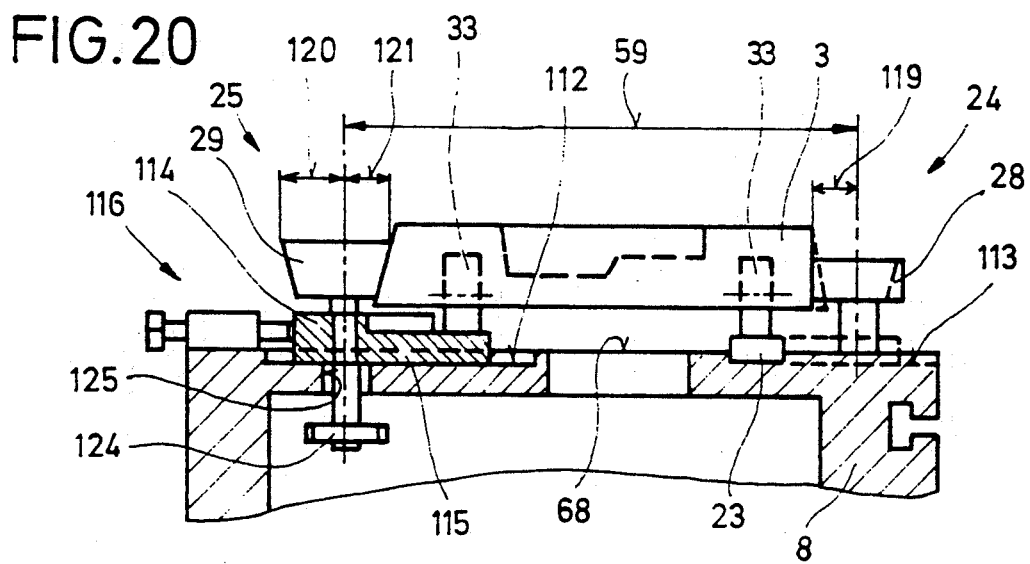
FIG. 20 shows installation in front view, partially in section according to lines XX—XX in FIG. 19.

In FIGS. 19 and 20, the guideways 24,25 are arranged on plane surfaces 112,113 of top surface 68 of the housing part 8. They include guide strips 23 extending in the conveying direction of the workpiece supports 3 and rails 114 having lateral extension 115 supporting rollers 33 arranged in the workpiece support 3. Support rollers 28 of the guideway 24 are rotatably mounted on vertical axes in the housing part 8. Radially elastic pressure rollers 29 are rotatably mounted on vertical axes on the rail 114. Adjustment drives 116 are associated with the rail 114 and the adjusted rail is held in position by fixing devices 117. This makes it possible for the width 60 of the workpiece support 3 to be greater than a distance 59 between the guide rollers 28 and the pressure roller 29, reduced by their radii 119,120. The radius 120 is therefore reduced by a deformation of the pressure roller 29 to a distance 121. Thereby, a pressure force is exerted in the direction of an arrow 122, and a play-free guidance of the workpiece support 3 along the guideway 24 is obtained. The adjustment drive 116 may for example, as illustrated, be formed by screws, but also by stepping motor drives, eccentric drives or cylinder drives, whereby an automatic control of the distance 59 is achieved for variable widths 60 of the workpiece supports 3. Thereby, installations which are thus equipped can be matched very rapidly to altered requirements through the possibilities of adjustment and changeover, and they are therefore able to be used universally. As further illustrated by dashed lines, the support rollers 28 may also have a tapered running surface narrowing in the direction of the face 68, whereby a lifting of the workpiece support 3 on this longitudinal side can be additionally prevented. It is also additionally possible to arrange several support rollers 28 on a common assembly strip 123 and to likewise associate with the assembly strip 123 an adjustment drive and an attachment device. Through the arrangement of the support rollers 28 and pressure rollers 29 on assembly strips 123 and assembly rails 114 adjustable transversely to the conveying direction, the bores 125 associated with the axes 124 in the housing part 8 are able to be constructed with an excess taking into account the adjustment path and without requiring precision.

Figure 21:
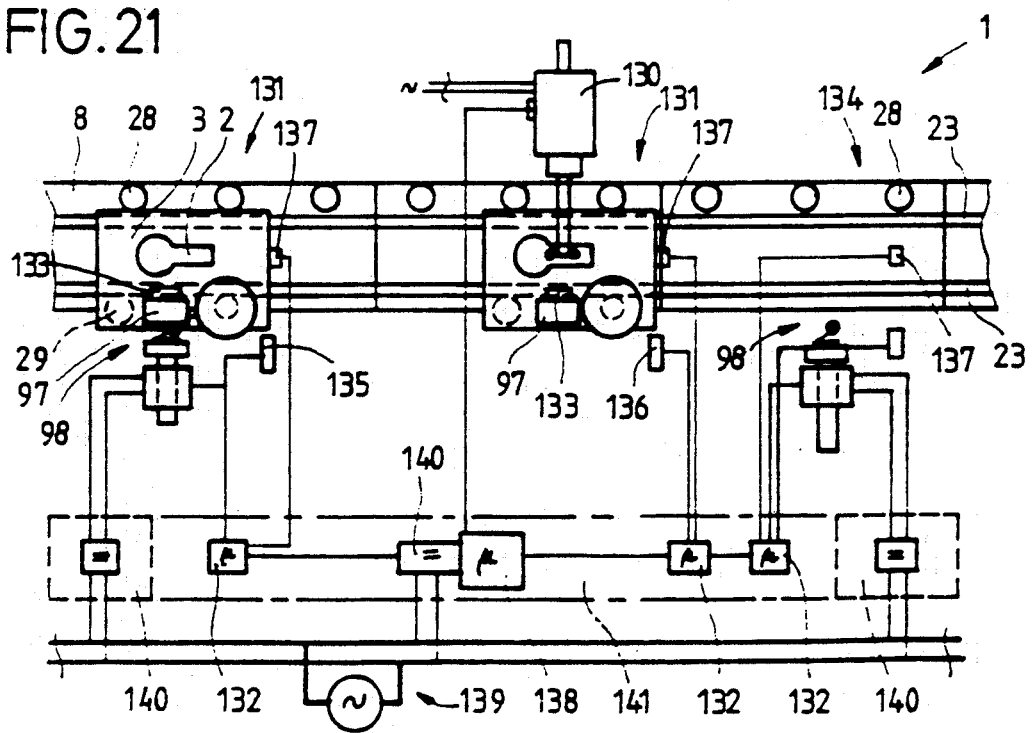
FIG. 21 shows a part of an installation constructed according to the invention in plan view and with schematic representation of the supply- and control device.

FIG. 21 illustrates a part of an installation 1' according to the invention is illustrated, with feed device comprising motors of various types, for example electric stepping motors or pneumatic motors. Such an installation is composed of a number of housing parts 8 with the guide strips 23 arranged thereon and support rollers 28 for the guidance of the workpiece supports 3 holding the components 2. Energy supply devices 98 transmit energy, for example electrical energy, or a pressure medium, for example compressed air or pressure oil, from the housing parts 8 to the workpiece supports 3. The supply device 98 may be formed, as in FIGS. 14 and 15, by sliding contacts or plug contacts, which are brought into connection with the coupling parts of the storage device 97 on the workpiece support 3 automatically or by spring action or by their own drives. In the illustrated embodiment, spring-loaded contacts are provided with contact rollers which, when the workpiece support 3 runs into the region of the supply device 98 automatically engage the corresponding coupling members of the workpiece support 3. Consequently, electrical energy can be transferred and stored in the storage device 97 formed by a battery. This storage device 97 may, however, be formed for example in the case of a pressure medium by a hydraulic oil reservoir or a compressed air storage container.

Furthermore, handling equipment 130 or other machining or manipulating devices or delivery equipment are attached to the housing parts 8. The storage devices 97, as shown in position 131, are supplied with energy via the supply device 98 as required, or at intervals, but in particular in the region of the machining sites, i.e. whilst the workpiece supports 3 are at a standstill. At the same time, with the transmission of energy, control signals, measurement data or various positions can be transmitted from an external processor 132 to the control device 133 arranged on the workpiece support. These control commands can establish the next position of the workpiece support 3 or also the speed for the following conveying section. The positions 131 and 134 are picked up via sensors 135,136, connected with the processor 132, such as, for example induction measured value pickups or optical and/or electronic reading devices, and are held with positioning devices 137. A common computer 138 coordinates the external processors 132 and monitors the entire operation. Furthermore, an energy source 139 is connected via a transformer 140 to the computer combination 141 and energy supply device 98 arranged on the housing parts 8.

Figure 22:
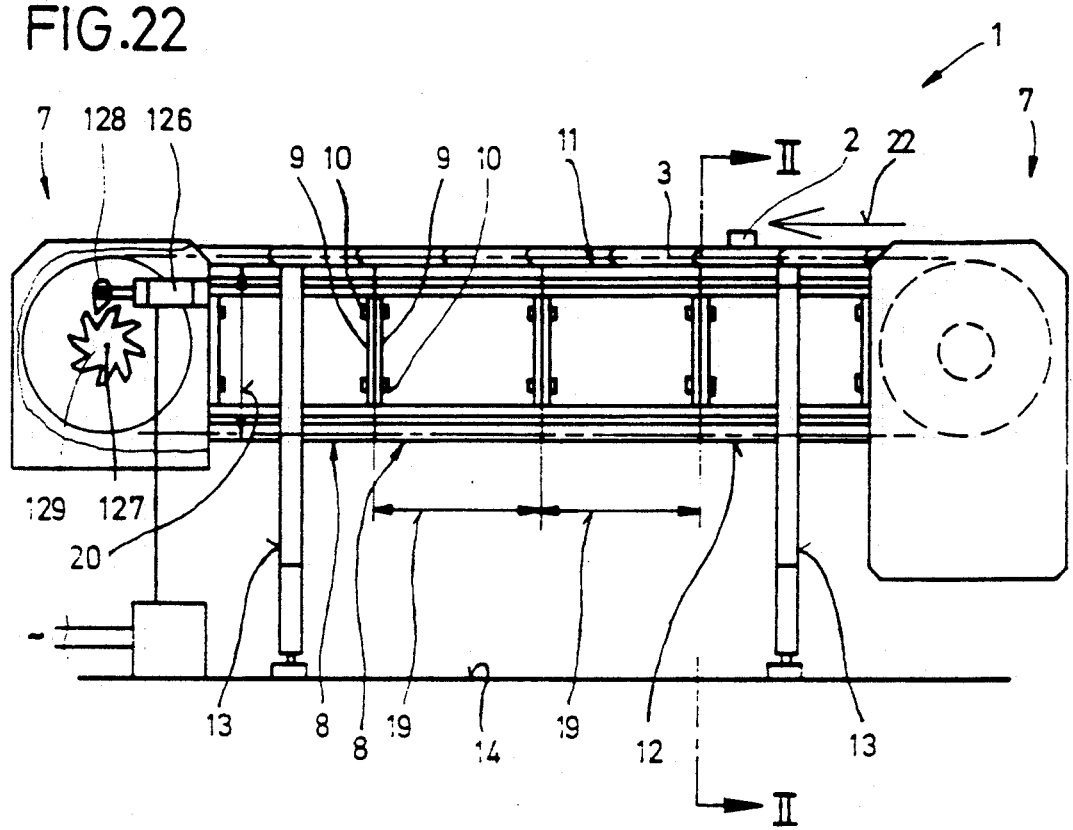

As illustrated in FIG. 22 instead of with the feed drive 6, such as installation can be operated with a device which makes possible a timed feed movement in the conveying direction. Such a device is, for example, a cylinder 126, acted upon by compressed air or pressure oil, the linear movement of which is converted into a rotational movement of an axis 127 of the deflection station, such as, for example, by a catch 128 arranged on the piston rod of the cylinder 126 and a catch wheel 129 arranged on the axis 127.

I claim:

1. An installation for processing components, which comprises (a) a series of workpiece supports having receptacles for holding the components, each workpiece support having opposite sides,
(b) a feed device for moving the workpiece supports in a conveying direction extending parallel to the workpiece support sides,
(c) a respective lateral guideway alongside each side of the workpiece supports and including guide elements for guiding the workpiece supports in the conveying direction,
   (1) the feed device being separate from, and operable independently of, the lateral guideways, and
(d) a pressing device at one of the lateral guideways and arranged to bias the workpiece supports towards the opposite lateral guideway and perpendicularly to the conveying direction whereby the workpiece supports are held without play between the guide elements of the lateral guideways,
   (1) the guide elements comprising radially elastic pressure rollers arranged between the one lateral guideway and the workpiece supports, the pressure rollers constituting the pressing device, and
   (2) the guide elements further comprising support rollers spaced from each other along the opposite lateral guideway, the support rollers being rotatable about vertical axes and the pressure rollers biasing the workpiece supports against the support rollers, the distance perpendicularly to the conveying direction between the pressure rollers in their relaxed state and the support rollers being less than the width of the workpiece supports therebetween.

2. The installation of claim 1, wherein the pressure rollers and support rollers are staggered from each other in the conveying direction.

3. The installation of claim 1, wherein the guide elements at the opposite lateral guideway comprise pressure rollers mounted on the workpiece supports.

4. The installation of claim 3, further comprising a drive connected to at least some of the pressure rollers for driving the pressure rollers to assist in moving the workpiece supports in the conveying direction.

5. The installation of claim 4, further comprising an energy storage device mounted on the workpiece supports and connected to the drive, an energy supply, and detachable coupling means for connecting the energy storage device to the energy supply.

6. An installation for processing components, which comprises
(a) a series of workpiece supports having receptacles for holding the components, each workpiece support having opposite sides, the workpiece supports being comprised of two parts,
   (1) a lower workpiece support part carrying rollers for supporting the workpiece supports on a support surface and
   (2) an upper workpiece support part carrying the receptacles for the components,
(b) a feed device for moving the workpiece supports in a conveying direction extending parallel to the workpiece sides,
(c) a respective lateral guideway alongside each side of the workpiece supports and including guide elements for guiding the workpiece supports in the conveying direction,
   (1) the feed device being separate from, and being operable independently of, the lateral guideways, and
(d) a pressing device at one of the lateral guideways and arranged to bias the workpiece supports towards the opposite lateral guideway and perpendicularly to the conveying direction whereby the workpiece supports are held without play between the guide elements of the lateral guideways.

7. The installation of claim 6, further comprising positioning elements for interconnecting the workpiece support parts in a predetermined relationship.

8. The installation of claim 6, wherein the lower and upper workpiece support parts define a dividing plane therebetween, the rollers having stub axles journaled in bores in the workpiece support parts and the bores being symmetrical with respect to the dividing plane.

9. An installation for processing components, which comprises
(a) a series of workpiece supports having receptacles for holding the components, each workpiece support having opposite sides,
   (1) the workpiece supports being linked together to form a conveyor chain moving in a conveying plane in a conveying direction extending parallel to the workpiece support sides,
(b) link pins extending parallel to the conveying plane and perpendicularly to the conveying direction linking adjacent ends of successive ones of the workpiece supports together,
(c) a stepping drive connected to the conveyor chain for moving the workpiece supports in the conveying direction,
(d) a respective lateral guideway alongside each side of the workpiece supports and including guide elements for guiding the workpiece supports in the conveying direction,
   (1) the stepping drive being separate from, and being operable independently of, the lateral guideways, and
(e) a pressing device at one of the lateral guideways and arranged to bias the workpiece supports towards the opposite lateral guideway and perpendicularly to the conveying direction whereby the workpiece supports are held without play between the guide elements of the lateral guideways.

10. An installation for processing components, which comprises
(a) a series of workpiece supports having receptacles for holding the components, each workpiece support having opposite sides,
(b) a feed device for moving the workpiece supports in a conveying direction extending parallel to the workpiece sides, the feed device comprising
   (1) friction rollers engaging an underside of the workpiece supports and rotatable about axes extending perpendicularly to the conveying direction and parallel to a conveying plane along which the workpiece supports are moved,
(c) a respective lateral guideway alongside each side of the workpiece supports and including guide elements for guiding the workpiece supports in the conveying direction,
   (1) the feed device being separate from, and being operable independently of, the lateral guideways, and
(d) a pressing device at one of the lateral guideways and arranged to bias the workpiece supports towards the opposite lateral guideway and perpendicularly to the conveying direction whereby the workpiece supports are held without play between the guide elements of the lateral guideways.

11. An installation for processing components, which comprises
   (a) a series of workpiece supports having receptacles for holding the components, each workpiece support having opposite sides,
   (b) a feed device for moving the workpiece supports in a conveying direction extending parallel to the workpiece sides, the feed device comprising
      (1) racks affixed to an underside of the workpiece supports and extending in the conveying direction, and
      (2) drive pinions engaging the racks and rotatable about axes extending perpendicularly to the conveying direction,
   (c) a respective lateral guideway alongside each side of the workpiece supports and including guide elements for guiding the workpiece supports in the conveying direction,
      (1) the feed device being separate from, and being operable independently of, the lateral guideways, and
   (d) a pressing device at one of the lateral guideways and arranged to bias the workpiece supports towards the opposite lateral guideway and perpendicularly to the conveying direction whereby the workpiece supports are held without play between the guide elements of the lateral guideways.

12. An installation for processing components, which comprises
   (a) a series of workpiece supports having receptacles for holding the components, each workpiece support having opposite sides,
   (b) a feed device for moving the workpiece supports in a conveying direction extending parallel to the workpiece sides,
   (c) a respective lateral guideway alongside each side of the workpiece supports and including guide elements for guiding the workpiece supports in the conveying direction,
      (1) the feed device being separate from, and being operable independently of, the lateral guideways, for feeding the workpiece supports along the entire length of the guideways,
   (d) a pressing device at one of the lateral guideways and arranged to bias the workpiece supports towards the opposite lateral guideway and perpendicularly to the conveying direction whereby the workpiece supports are held without play between the guide elements of the lateral guideways while they are fed therealong, and
   (e) a housing part carrying the lateral guideways,
      (1) the pressing device being arranged between the housing part and the one lateral guideway.

* * * * *